US012600605B1

(12) United States Patent
Tingle

(10) Patent No.: US 12,600,605 B1
(45) Date of Patent: Apr. 14, 2026

(54) BATTERY CELL EXTRACTION TOOL AND METHOD OF USING

(71) Applicant: Government of the United States, as represented by the Secretary of the Air Force, Wright-Patterson AFB, OH (US)

(72) Inventor: Robert Tingle, Olympia, WA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 337 days.

(21) Appl. No.: 18/312,951

(22) Filed: May 5, 2023

(51) Int. Cl.
| | |
|---|---|
| *B66F 1/00* | (2006.01) |
| *H01M 50/209* | (2021.01) |
| *H01M 50/55* | (2021.01) |
| *H01M 50/553* | (2021.01) |

(52) U.S. Cl.
CPC ............. *B66F 1/00* (2013.01); *H01M 50/209* (2021.01); *H01M 50/55* (2021.01); *H01M 50/553* (2021.01)

(58) Field of Classification Search
CPC ...... B66F 1/02; B66F 1/04; B66F 1/06; Y10T 29/53804; Y10T 29/53896
See application file for complete search history.

(56) References Cited

U.S. PATENT DOCUMENTS

| | | | |
|---|---|---|---|
| 1,389,355 A | 8/1921 | Herold | |
| 1,526,152 A | 2/1925 | Kinney | |
| 1,546,472 A | 7/1925 | Butta | |
| 1,837,792 A | * 12/1931 | Randolph | ............... B25B 27/02 |
| | | | 29/244 |
| 1,838,738 A | * 12/1931 | Bradley | .................. B25B 27/02 |
| | | | 29/244 |
| 1,853,448 A | * 4/1932 | Mykleby | ................... B25B 7/02 |
| | | | 29/244 |
| 1,856,621 A | * 5/1932 | Coffey | .................... B66C 5/025 |
| | | | 29/244 |
| 1,888,776 A | 11/1932 | Snell | |
| 2,107,715 A | 2/1938 | Runyan | |
| 2,254,085 A | 8/1941 | Nilson | |

(Continued)

OTHER PUBLICATIONS

Christopher Sommers, Innovation Win, Citizen Airman, Apr. 2020, p. 30, an official publication of the United States Air Force Reserve Command.

(Continued)

*Primary Examiner* — Jason L Vaughan
(74) *Attorney, Agent, or Firm* — AFMCLO/JAZ; Larry L. Huston

(57) ABSTRACT

An apparatus for removing a battery cell from a rigid housing containing a plurality of contiguous battery cells. The apparatus bridges the housing with a jack that ratchets up a selected battery cell by attachment to undercuts in the terminals. The jack has a hinged connection between the bridge and a manually operated handle. A user operates the handle to raise a strut interfacing between the bridge and the terminals of the battery cell. Upon removal from the housing the battery cell is refurbished or replaced. The apparatus can be used with a selected battery cell in a grid of battery cells without modification or adjustment due to the position of a particular cell within the grid or due to cells having different heights relative to the top of the housing.

19 Claims, 12 Drawing Sheets

(56)                References Cited

U.S. PATENT DOCUMENTS

| | | | |
|---|---|---|---|
| 2,260,993 | A | 10/1941 | Johnston |
| 2,266,760 | A | 12/1941 | Hunz |
| 2,314,126 | A * | 3/1943 | Colley ................ H01M 50/256 |
| | | | 29/246 |
| 2,383,204 | A | 8/1945 | Le Veque |
| 2,638,490 | A * | 5/1953 | Snyder ............... H01M 50/256 |
| | | | 429/96 |
| 3,266,773 | A | 8/1966 | Cole |
| 4,055,364 | A * | 10/1977 | Breite ...................... B65G 7/12 |
| | | | 294/903 |
| 4,513,950 | A | 4/1985 | Yamagishi |

OTHER PUBLICATIONS

Ann Butler, AF Spark Tank 2020 446th Maintenance Group, 446th Airlift Wing Public Affairs (AFRC), Internet Video, lasting 2 minutes 48 seconds, Sep. 13, 2019, dvidshub.net https://www.dvidshub.net/video/710141/446th-mxs-battery-tool.

AFA Warfare Symposium, Internet site with video link, Air & Space Forces Association, Mar. 6-Mar. 8, 2023, Spark Tank Finals, 1 hour, 5 minute embedded video link.

AFWERX, Air Force Spark Tank 2020—Watch the full event!, Feb. 29, 2020, 1 hour: 3 minute, 720p YouTube video, relevant at 29:36-37:46, https://www.youtube.com/watch?v=Tzxa-Q6V9iM.

Air Force Association Air Warfare Symposium a Professional Development Event, Spark Tank Final Competition, Feb. 28, 2020, 1 hour: 12 minute, 1080p YouTube video, relevant at 38:17-46:36. https://www.youtube.com/watch?v=4gqVVtkp_A8.

AFWERX, Battery Extraction Tool for Spark Tank 2020, Feb. 22, 2020, 2 minute: 48 second 720p YouTube video. https://www.youtube.com/watch?v=b9KcHhJ3F6s.

* cited by examiner

35N

35ST

35

15

45

42          40

43

44

23C          CL          23C

21

BATTERY CELL EXTRACTION TOOL AND METHOD OF USING

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to an apparatus for removing a battery cell from a housing containing plural battery cells in contact with adjacent cells and more particularly to such an apparatus which does not require compensation to remove battery cells from different positions within the housing or having different heights.

BACKGROUND OF THE INVENTION

The McDonnell Douglas Boeing C-17 cargo aircraft made its maiden flight on Sep. 15, 1991, and the first production model was delivered to Charleston Air Force Base Jun. 14, 1993. Lockheed-Georgia Co. delivered the first operational C-5A Galaxy transport aircraft to Charleston AFB, South Carolina, in June 1970. The KC-46 air refueling plane made its initial flight in December 2014. The C-27 tactical transport aircraft entered service in 1997. Collectively these aircraft have more than 110 years of service across hundreds of air frames at dozens of domestic and foreign bases.

A feature common to these hundreds of aircraft across the century of combined use is a battery pack having a 7×3 grid of 21 battery cells contained in an open top rigid aluminum housing. The grid of battery cells is a tessellating array of cells with cells disposed in mutually perpendicular row and columns as viewed from above. Within a reasonable range the cells may be of different heights, so that different cells have the associated terminals at different elevations relative to the top of the housing. The battery cells are under slight compression within the housing so it can be as small as possible to conserve space on each of these aircraft and as an artifact of thermal expansion. Each cell has two upstanding externally threaded terminals for receiving leads to connect external loads or to wire the cells in series/parallel.

When a cell fails, or the entire battery pack of cells is to be replaced, conventionally a T-handle is threaded onto each terminal and the cell is lifted out of the housing by brute force. But this arrangement has problems. The vertical lifting force necessary to remove the cell from the housing is considerably greater due than the weight of an individual cell to the lateral compression. A slight off-angle pull breaks the terminals from the cell, requiring the cell to be discarded. Injuries have resulted from this removal process.

Current estimates are that at least $1.3M in replacement costs occur during battery cell maintenance each year. Reparable battery cell damage and injuries to personnel bring these costs even higher. Clearly a better approach is needed.

Such approach must address the problem of overcoming the lifting force needed to remove a cell from the rigid housing and simultaneously address the problem of being usable with any selected battery cell in a grid of battery cells without modification or adjustment due to or to compensate for the position of a particular cell within the grid or due to or to compensate for battery cells having different heights relative to the top of the housing. Such an apparatus is preferably a compact tool to fit within available maintenance facilities and is versatile enough to accommodate multiple generations of the four cited aircraft platforms.

SUMMARY OF THE INVENTION

In one embodiment the invention comprises an apparatus for removing a battery cell from a rigid housing containing a plurality of contiguous battery cells within upstanding sidewalls of the housing, the cell having at least one upstanding terminal. The apparatus comprises an elongate handle for manipulation by a user, a bridge sized to span a pair of opposed sidewalls of the housing, a strut vertically movably associated with the bridge responsive to articulating input from the handle when operated by a user and at least one attachment pivotally joined to the strut for removably joining to at least one upstanding terminal of a selected battery cell, wherein vertical movement of the strut responsive to manipulation of the handle by the user removes the selected battery cell from the housing independent of the height of the battery cell or position within the housing. In another embodiment the invention comprises a method for removing a battery cell from a housing containing a grid comprising a plurality of contiguous battery cells within upstanding sidewalls of the housing, the cell having at least one upstanding threaded terminal, by using such an apparatus.

DETAILED DESCRIPTION OF THE INVENTION

Figure 1:
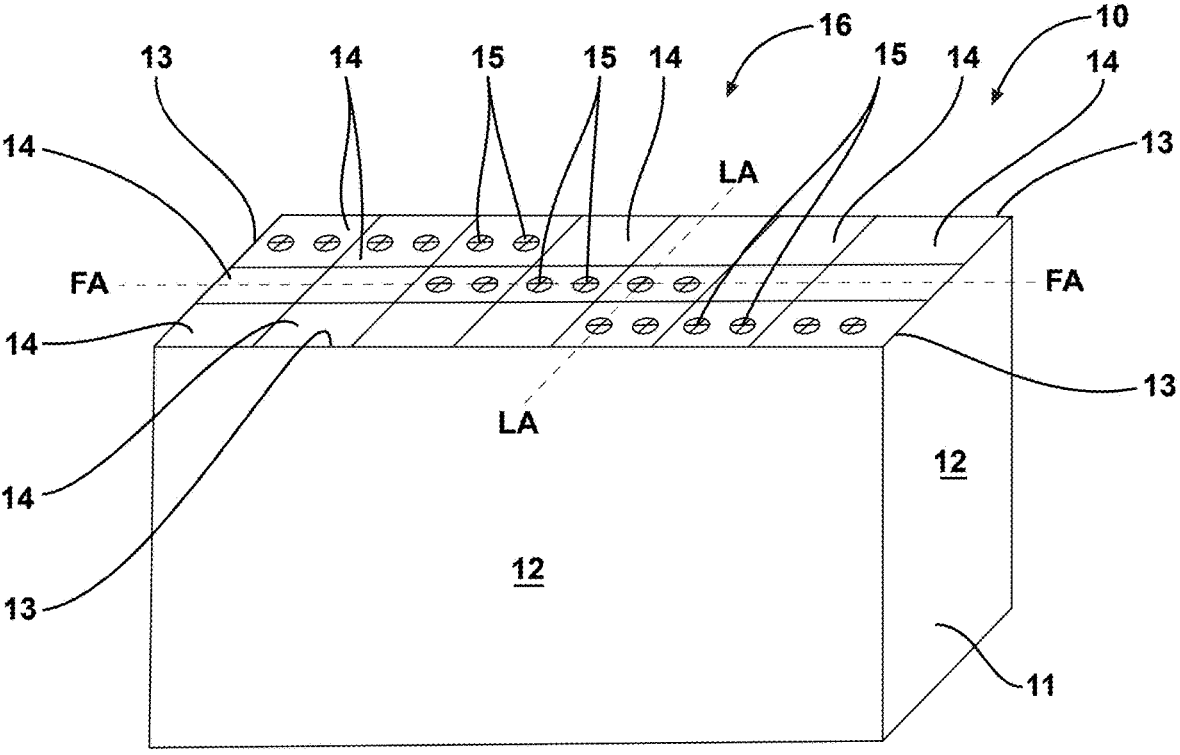
FIG. 1 is a schematic perspective view of a battery usable with the present invention.

Referring to FIG. 1 a battery 10 according to the present invention comprises a plurality of dual terminal 15 cells 14 contained within a housing 11. The housing 11 is rigid and has two pairs of alternatingly opposed and upstanding sidewalls 12, a floor and an open top. By rigid it is meant that the housing 11 will resist compressive forces applied during operation without crumbling or undue deformation. The housing 11 may have a constant or variable height relative to the floor pan. A variable height will yield battery 10 cells 14 having likewise variable heights relative to the top of the housing 11, which can be accommodated by apparatus 20 claimed herein without adjustment or compensation. Each cell 14 has a generally constant rectangular cross section. The cells 14 are typically, but not necessarily, equally sized. The terminals 15 have an undercut such as a bayonet fitting or typically are threaded and more particularly are externally threaded.

The terminals 15 of each cell 14 are typically generally parallel one pair of the upstanding sidewalls 12 and define a fore-aft axis FA therebetween and a lateral axis LA perpendicular thereto. The mutually perpendicular fore-aft axis FA and lateral axis LA define a plane which is generally horizontal when the battery 10 is placed on a floor or other work surface.

The housing 11 is sized to contain the desired number of cells 14 in a fixed and vertical configuration. A typical battery 10 has a 7×3 array of cells 14 arranged in a FA-LA (XY) grid 16 and weighs approximately 36.3 kg. The cells 14 are under slight compression within the upstanding sidewalls 12 of the housing 11 to reduce chatter during flight and conserve footprint of the housing 11. The housing 11, and particularly the upstanding sidewalls 12, may have aluminum construction, to withstand vertical compressive loading when the apparatus 20 is used by an operator to remove and replace cells 14 to meet service requirements. The cells 14, housing 11 or battery 10 form no part of the invention except as may be specifically claimed hereinbelow.

Figure 2:
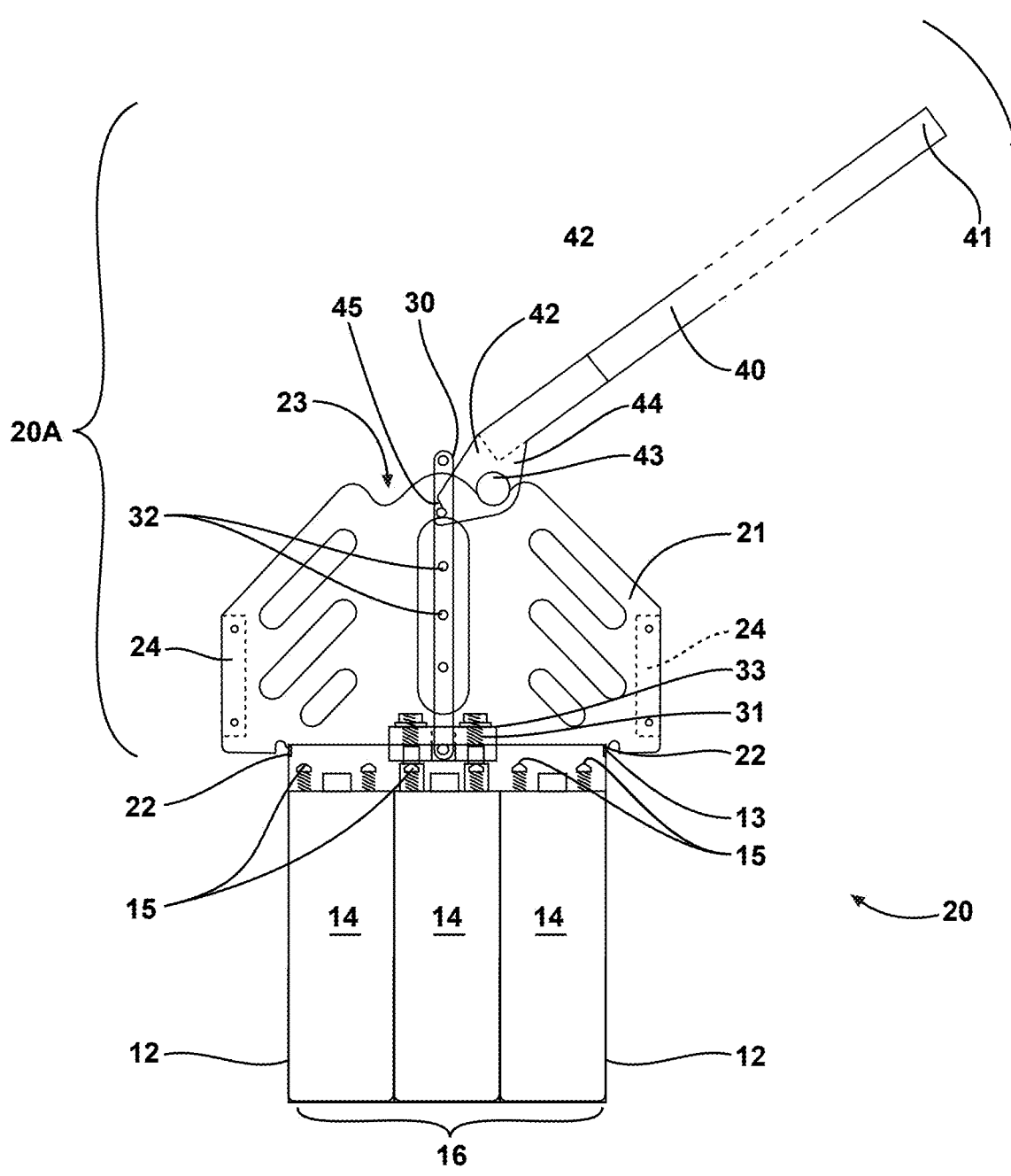
FIG. 2 is a scale side elevational view of an apparatus according to the present invention, with the housing shown in cutaway and showing the spacers in phantom.

Referring to FIG. 2, the apparatus 20 of the present invention comprises the battery 10 and a subassembly 20A independent therefrom. The subassembly 20A comprises a bridge 21 sized to span the housing 11, particularly in the direction of the lateral axis LA, although the invention is not so limited. One of skill will understand the invention can be readily adapted for the bridge 21 to span walls in the direction of the fore-aft axis FA or diagonally. The apparatus 20 also comprises a strut 30 which is vertically moveable independent of the bridge 21, an attachment 31 pivotally joined to the strut 30 and adapted for being removably joined to at least one battery 10 terminal 15 as selected by a user. Separable from the aforementioned components is an elongate handle 40 which the operator uses for mechanical advantage, particularly torque. It will be apparent to one of skill that the subassembly 20A claimed herein may be stored in a generally flat configuration.

Examining the subassembly 20A in more detail, the bridge 21 may comprise at least one plate sized to span opposed walls in a secure manner without failure under compressive loading applied thereto during the battery 10 cell 14 removal process. The bridge 21 may span opposed walls in the direction of the lateral axis LA so that a spreader 33 may be perpendicular thereto and intercept the terminals 15 oriented in the direction of the fore-aft axis FA. The bridge 21 is preferably non-conductive to reduce sparking or short circuits. The bridge 21 may be made of polymeric material, such as phenolic and/or nylon as may be used in additive manufacturing.

Figure 2A:
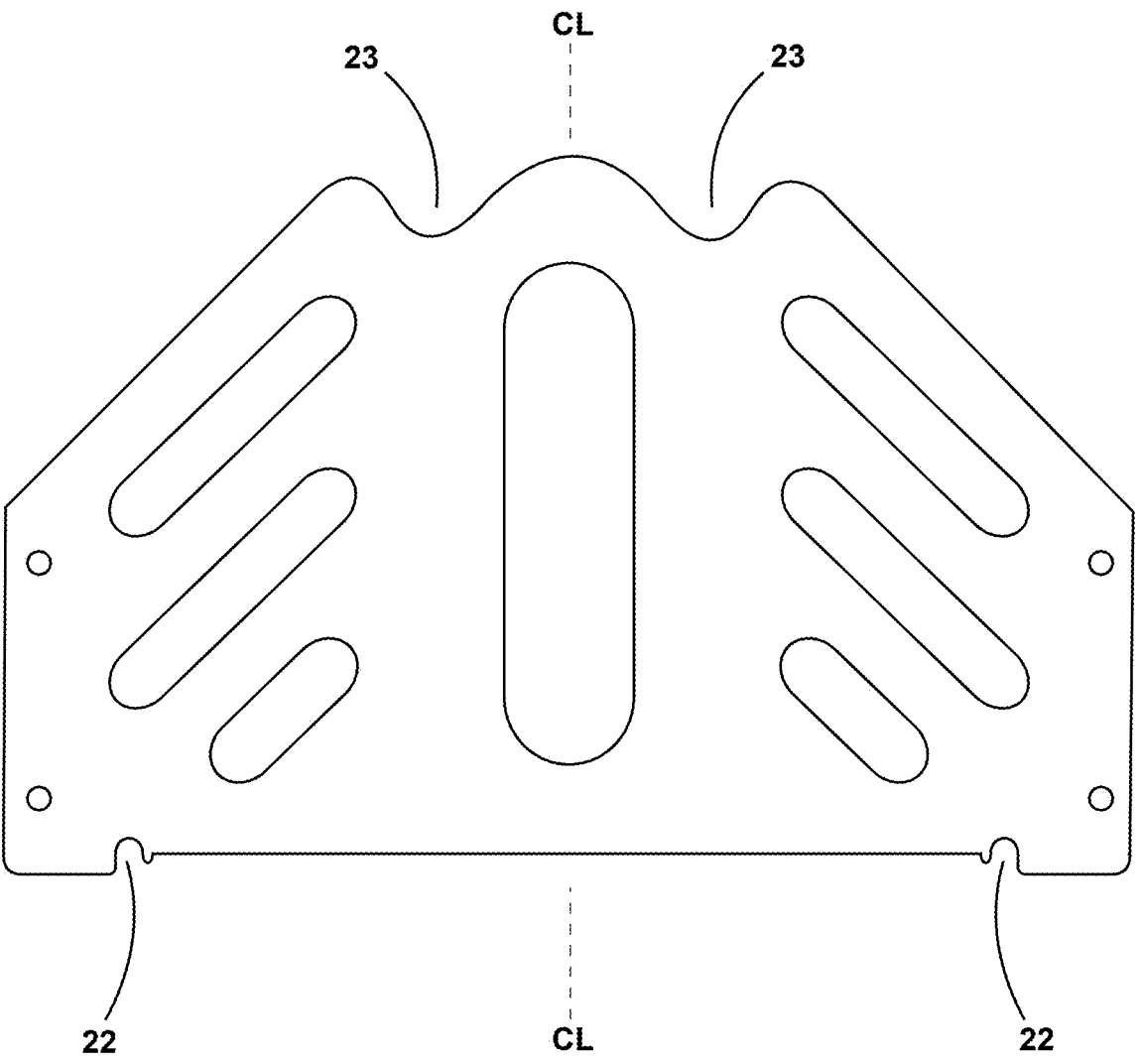
FIG. 2A is an enlarged scale side elevational view of the bridge of FIG. 2.

Referring to FIG. 2 and FIG. 2A if two polymeric plates are used for the bridge 21, each plate may have a thickness of 10 mm-13 mm and a length greater than the span between the opposed upstanding walls. The plate is preferably symmetric about a vertical centerline CL. The bottom of the plate may be substantially flat to prevent interference with battery 10 cells 14 therebelow. The bottom of the plate may have at least one plate notch 22, and preferably two spaced apart plate notches 22. The plate notches 22 engage the lips 13 of the upstanding sidewalls 12 to reduce misalignment.

The top of the plate has at least one open receptacle 23 to removably receive a complementary trunnion 43 therein as helpful to operate the handle 40. Preferably the top of the plate has two such open receptacles to removably receive the handle 40 from either side and to allow access to battery 10 cells 14 in both outboard rows and the center row of a 3×7 or other three row matrix of battery 10 cells 14 in a housing 11. The 23 allows for convenient and easy removal of the handle 40 from the bridge 21 for storage or maintenance on the next battery 10.

A bridge 21 comprising a single plate may be used, but would likely be unstable. Preferably the bridge 21 comprises two plates spaced apart in fixed relationship. The insides of the plates may be spaced apart a distance sufficient to accommodate the trunnions 43 of the handle 40 as discussed below. A pair of spacers 24 may be used, with one spacer 24 juxtaposed with each edge of the plate providing a rectangular structure as viewed from above. This arrangement provides a stable structure to resist compressive forces applied during use. The spacers 24 are preferably nonconductive as described above.

The apparatus 20 further comprises a strut 30 for engaging the handle 40 and the terminals 15 of the battery 10 cells 14. The strut 30 is preferably offset from the open receptacles of the plate and is preferably aligned with the vertical centerline of the plates. The strut 30 has opposed pegs 32 which engage with the handle 40 as described below. The pegs 32 may be staggered or are preferably mutually opposed for convenient engagement with the handle 40. The strut 30 may be made of steel or other metal and have a thickness of 5 mm to 8 mm for adequate tensile strength during use. The pegs 32 are preferably round for curvilinear engagement with the handle 40.

Figures 3A, 3B, 4, 5, 6:
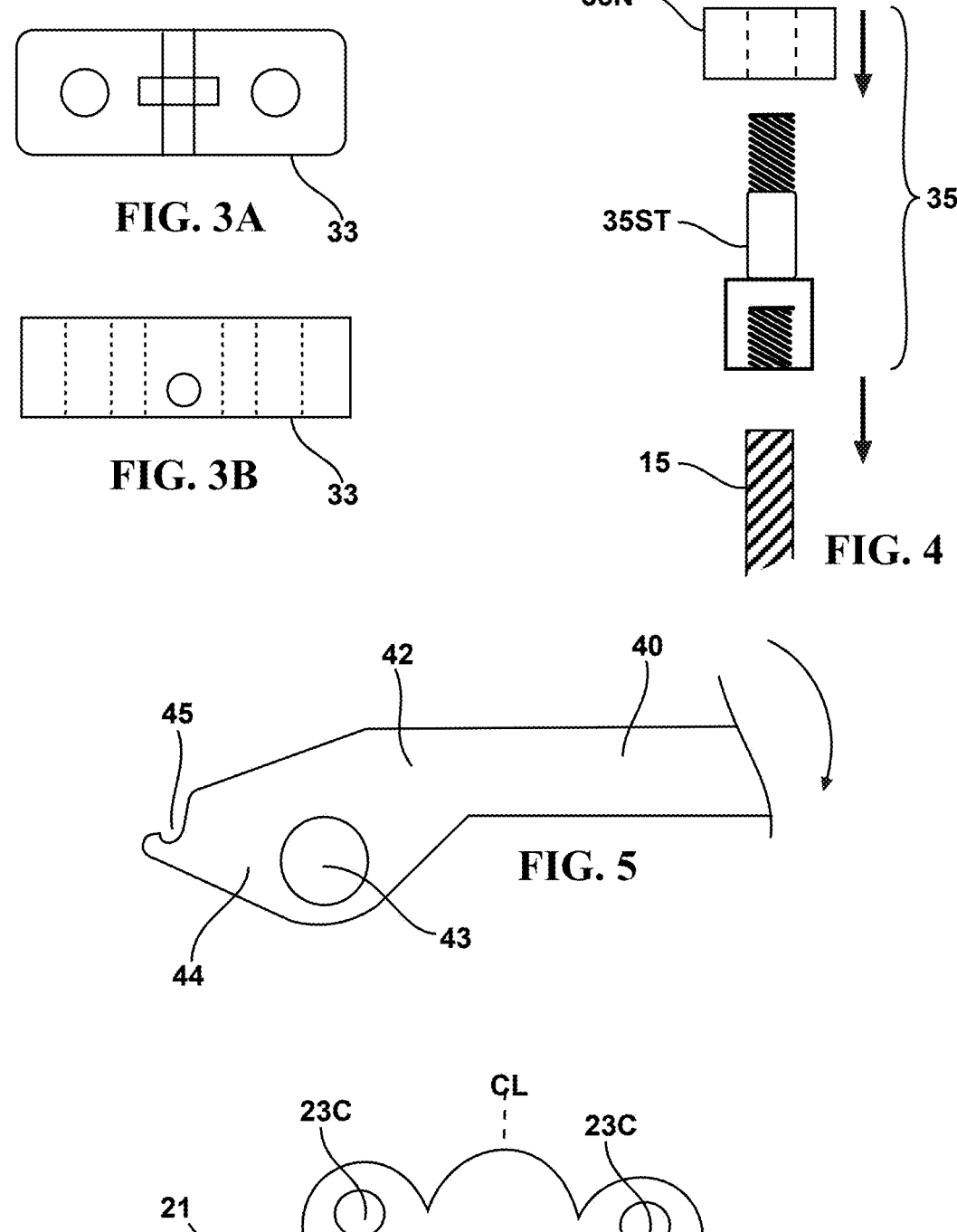
FIG. 3A is a scale top plan view of a spreader.
FIG. 3B is a scale side elevational view of the spreader of FIG. 3A.
FIG. 4 is a side elevational view of a lock including a nut, fragmentary terminal and a scale lock stud.
FIG. 5 is a scale side elevational view of a fragmentary handle showing the distal end.
FIG. 6 is a fragmentary side elevational view of an alternative embodiment of a bridge.

Referring to FIG. 3A and FIG. 3B, the strut 30 has a spreader 33 at the bottom attached at a pivot 36. The spreader 33 may be perpendicular to the thickness of the plate and is pivotably attached thereto. The spreader 33 may be made of nonconductive metal, such as brass, to provide strength without spark or short circuits.

The spreader 33 has an attachment configured for releasable attachment to two spaced apart terminals 15 of a particularly selected and/or predetermined singular battery 10 cell 14. Preferably, upon attachment to the spreader 33 the one terminal 15 is on each side of the opposed faces of the strut 30 for balance. The attachment 31 may comprise a pair of depending, axially rotatable, internally threaded fasteners. The strut 30 with the pivotably joined spreader 33 is lowered into position and each depending internally threaded fastener is manually attached to a respective externally threaded terminal 15 of a predetermined cell 14.

Referring to FIG. 4, upon attachment to the terminals 15, the spreader 33 may further comprise a lock 35 to reduce occurrences of the attachment 31 coming loose and thereby prevent unintended disengagement during operation. The attachment 31 may comprise a lock nut 35N and complementary externally threaded stud 35ST. The externally threaded lock stud 35ST is in fixed and nonrotatable relationship with the internally threaded attachment 31 stud 35. Upon attachment 31 of the internally threaded studs 35 to the terminals 15, the lock nuts 35N may be threadably engaged with the externally threaded lock studs 35ST.

Referring to FIG. 5, the elongate handle 40 has a proximal end 41 for grasping and operation by a user. Longitudinally opposed to the proximal end 41 is a distal end 42 which has mutually opposed trunnions 43 for removably fitting into and engaging the complementary open receptacles of the plates when the handle 40 is placed therebetween. The elongate handle 40 may have a total length between the proximal end 41 and the distal end 41 of 0.4 m to 0.8 m, 0.5 m to 0.7 m and particularly 0.6 m.

The handle 40 further comprises at least one panel 44, and preferably two spaced apart panels 44, with each panel 44 having a matched peg notch 45. The peg notches 45 are spaced to allow the strut 30 to fit therebetween and engage mutually opposed complementary pegs 32 of the strut 30. The notches are open to allow for convenient disengagement from and reengagement with successive pairs of pegs 32 as described below. The handle 40 is independent of and separable from the other components described herein for storage or alternative uses.

Referring to FIG. 6, if desired, the bridge 21 may have a closed receptacle 23C which is circular to fully engage a trunnion 43. This arrangement provides the benefit that the handle 40 is not lost or improperly separated from the bridge 21. Furthermore this embodiment may be used to install a cell 14 when placed above an empty cell 14 cavity.

Referring to FIGS. 7A-7H in order, in operation, a battery 10 cell 14 is selected for removal and maintenance/replacement. The cell 14 may be determined to have malfunctioned, been damaged or simply be rotated out of service for preventative maintenance. The apparatus 20 is placed on the housing 11 and stabilized. The attachment 31 is releasably attached to the terminals 15 of the predetermined cell 14. Optionally the attachment 31 is locked to the terminal 15 pair of the predetermined cell 14. While an embodiment having a strut 30 with 5 mutually opposed pegs 32 on each side of the strut 30 is shown, one of skill will recognize that any suitable plurality of pegs 32 may be utilized.

Figure 7A:
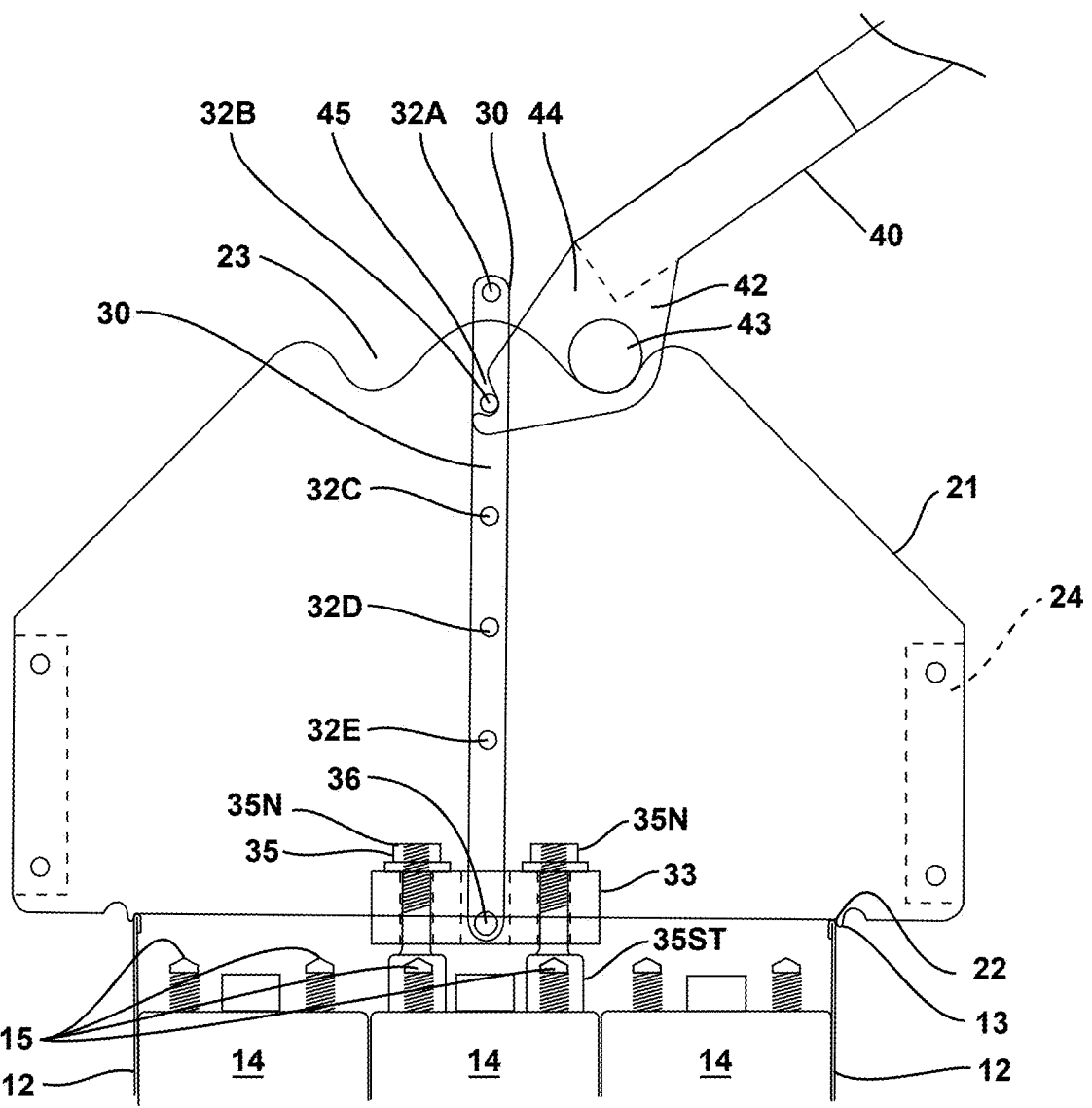
FIGS. 7A-7H are, in sequence, scale side elevational views of the apparatus of the present invention during a battery cell removal sequence with the housing shown in cutaway, the spacers shown in phantom and particularly showing pivot of the strut in FIGS. 7G and 7H.
Figure 7B:
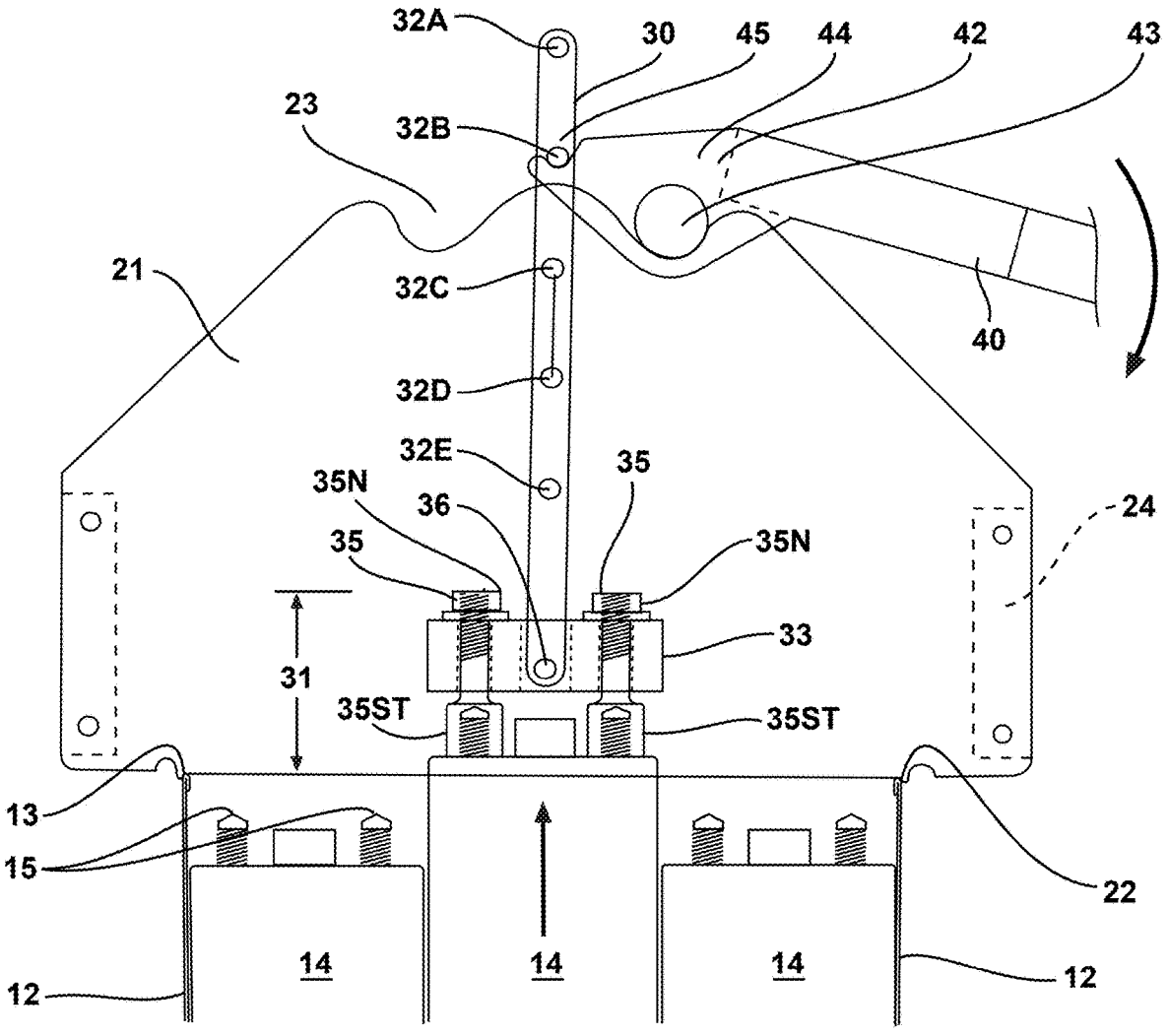

Referring particularly to FIG. 7A, the peg notches 45 of the one or more panels 44 of the handle 40 are engaged with the second peg 32 of the strut 30. While the first peg 32A of the strut 30 is shown to be unused in the embodiment as illustrated, one of skill will understand that if the top of the battery 10 cell 14 terminals 15 is further below the lip 13 of the housing 11, it will be necessary to start with the first peg 32A.

The handle 40 is in a raised position as the second peg 32B is engaged. The handle 40 is depressed in the direction of the arrow towards the floor to draw the battery cell 14 upwards and to elevate the battery cell 14 by hinge action against the bridge 21. The battery cell 14 advantageously does not drop down towards the bottom of the housing 11 due to friction against adjacent battery cells 14.

Figure 7C:
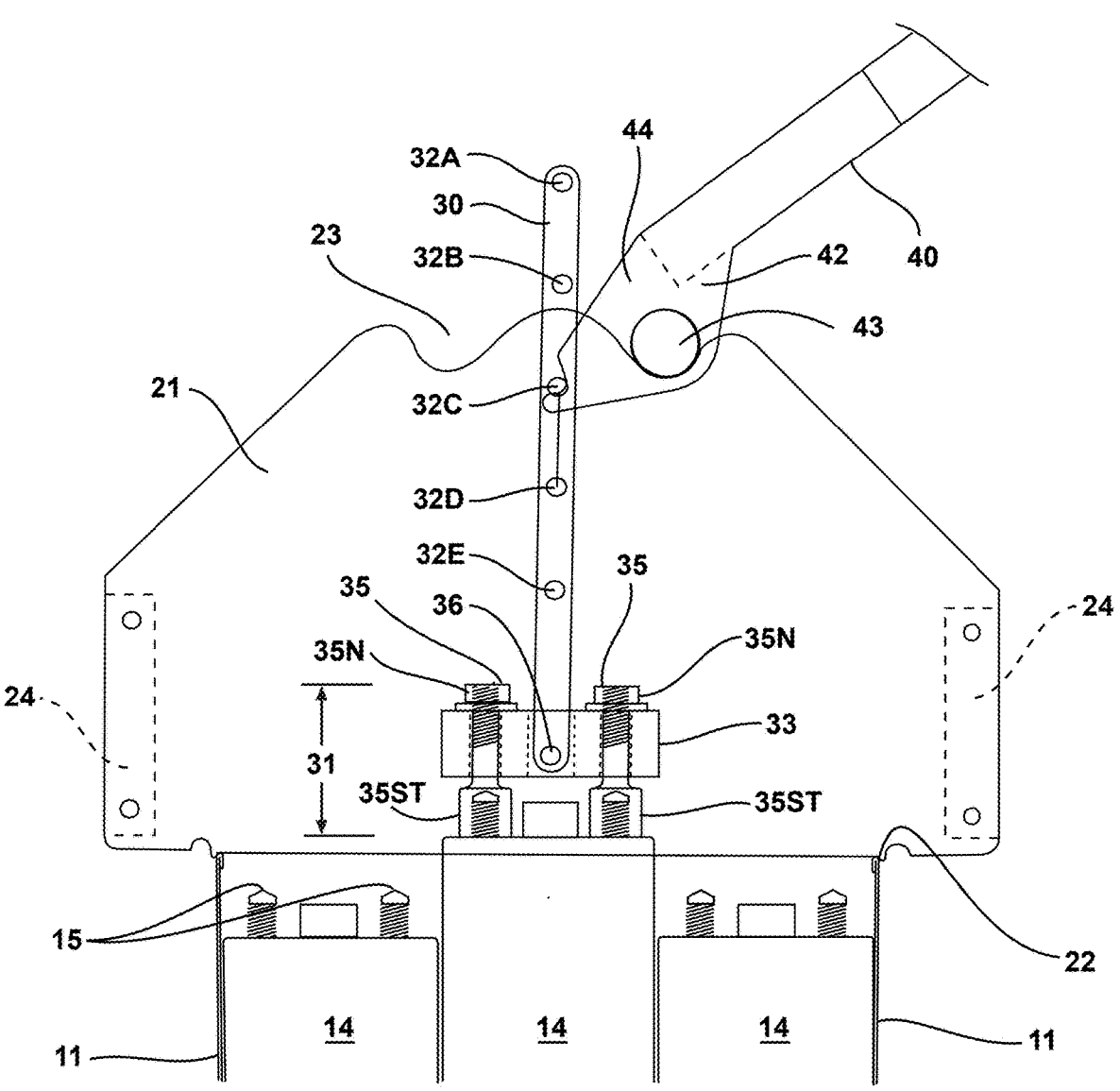
Figure 7D:
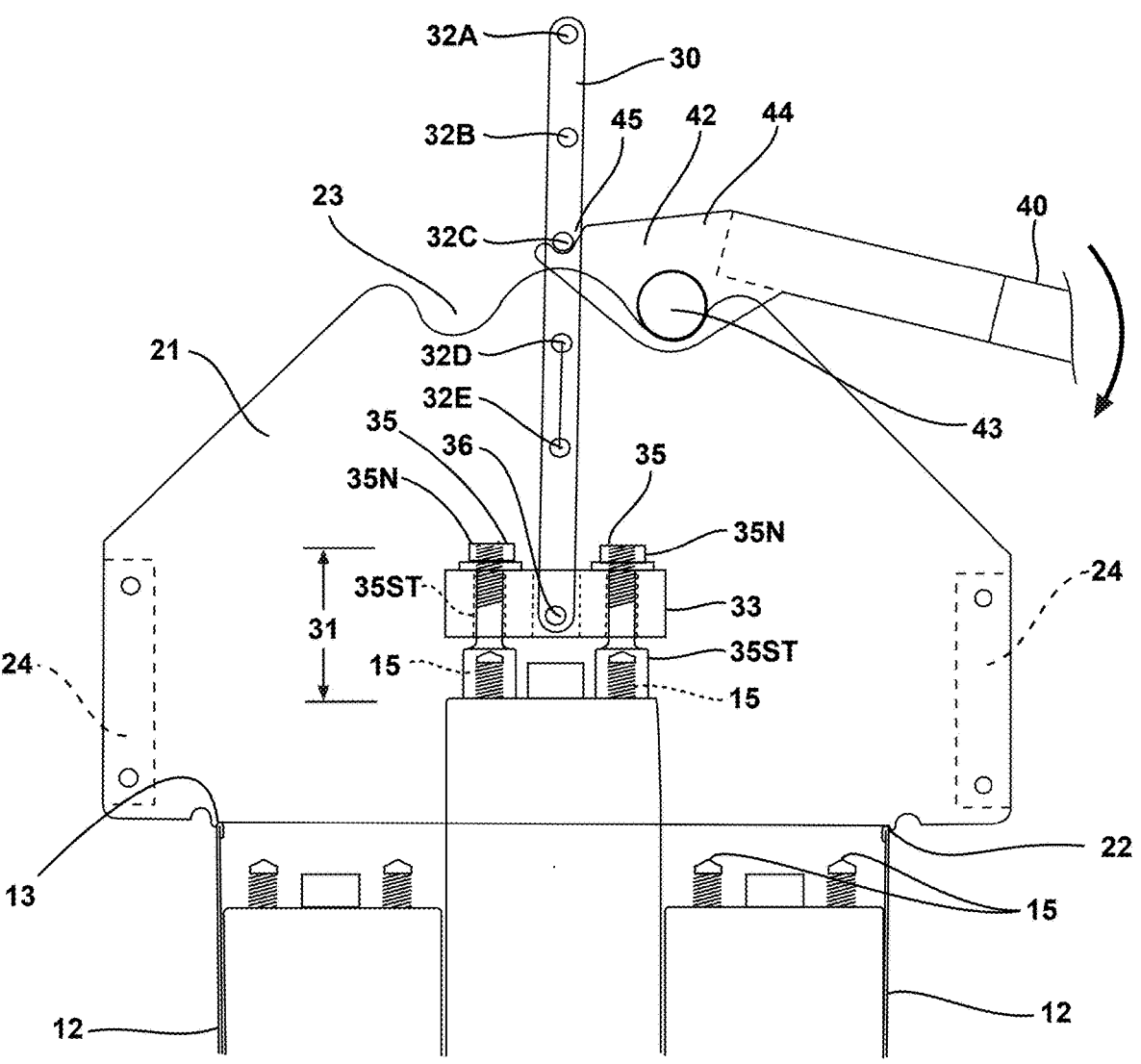
Figure 7E:
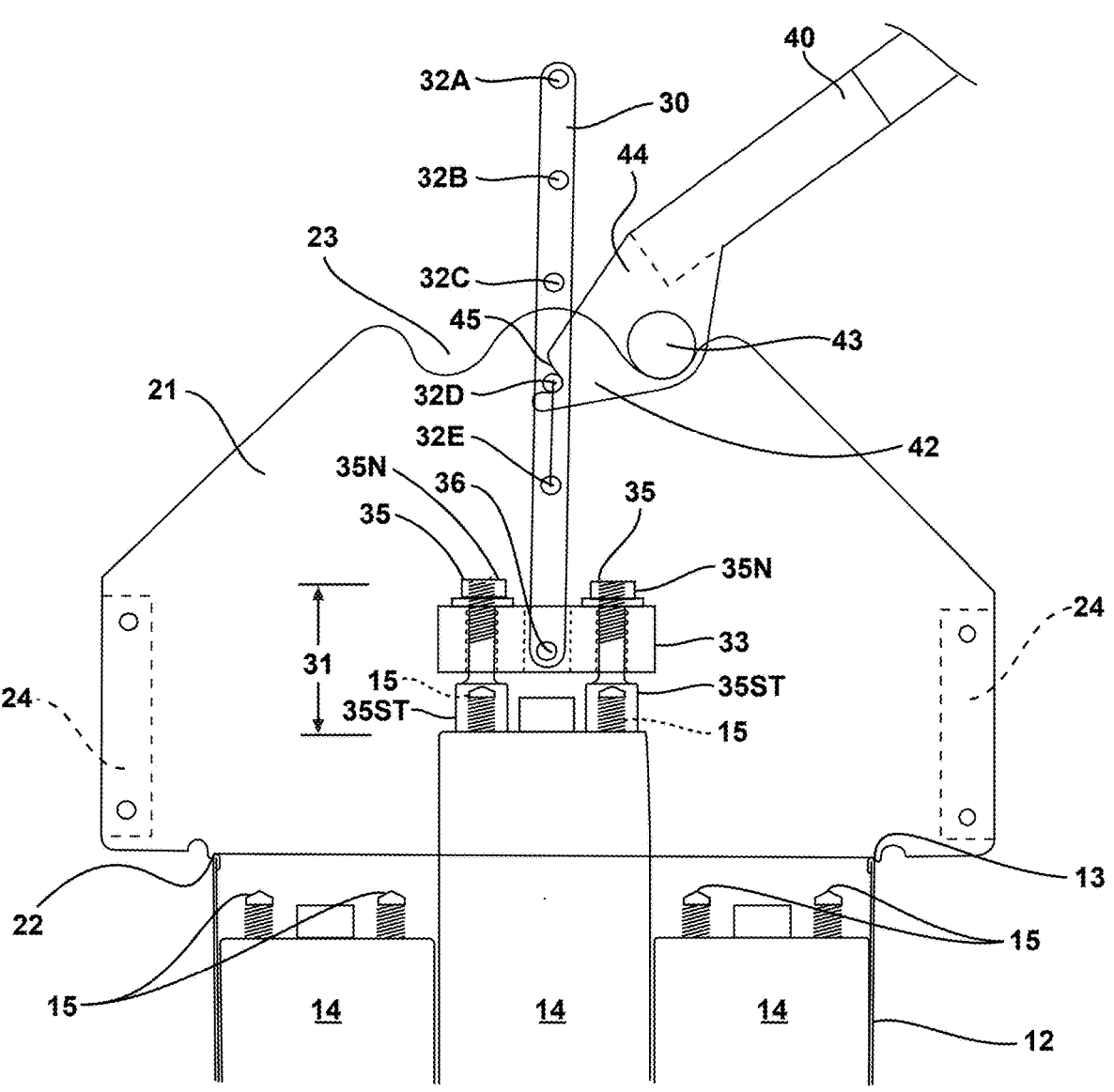
Figure 7F:
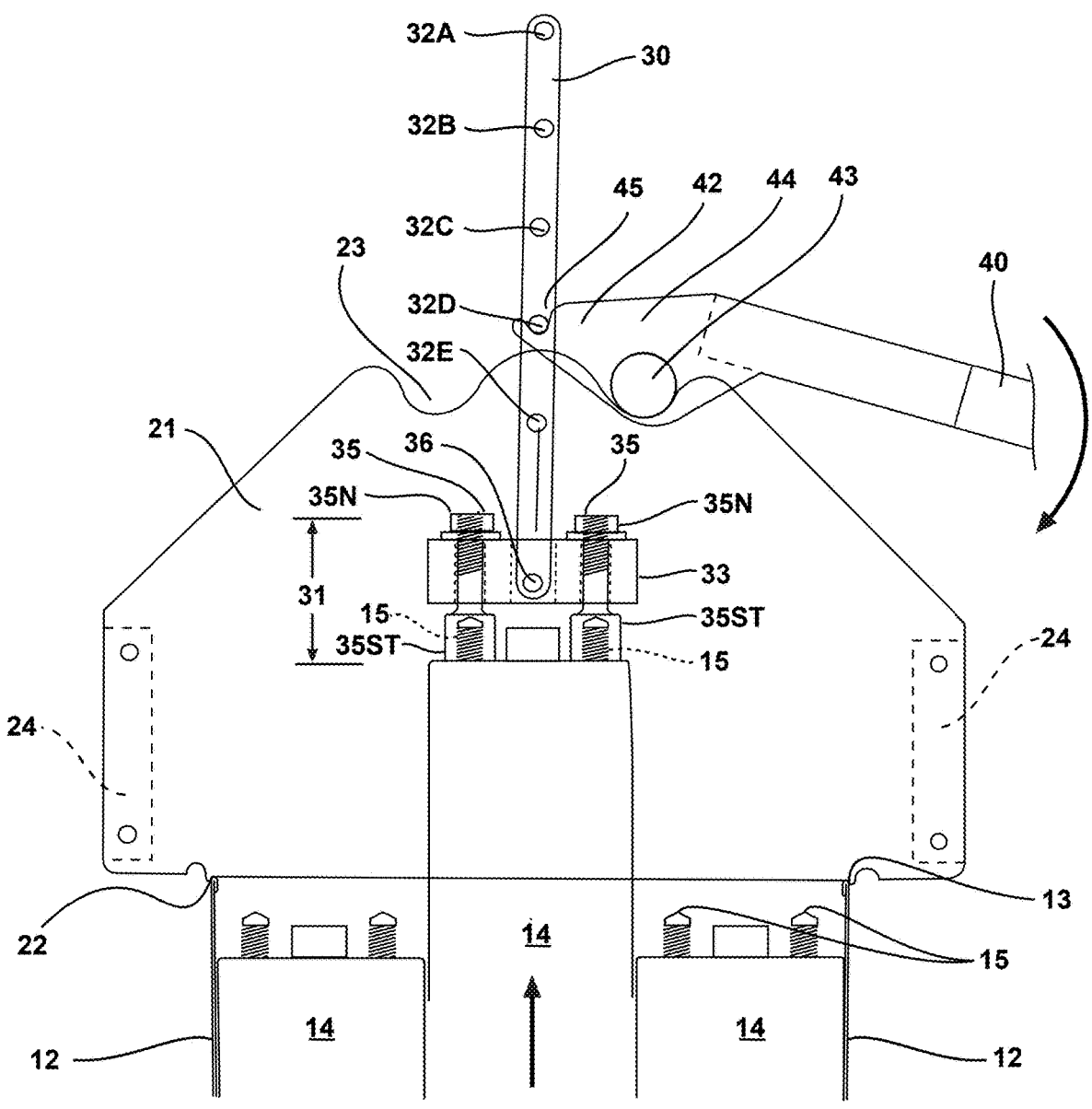
Figure 7G:
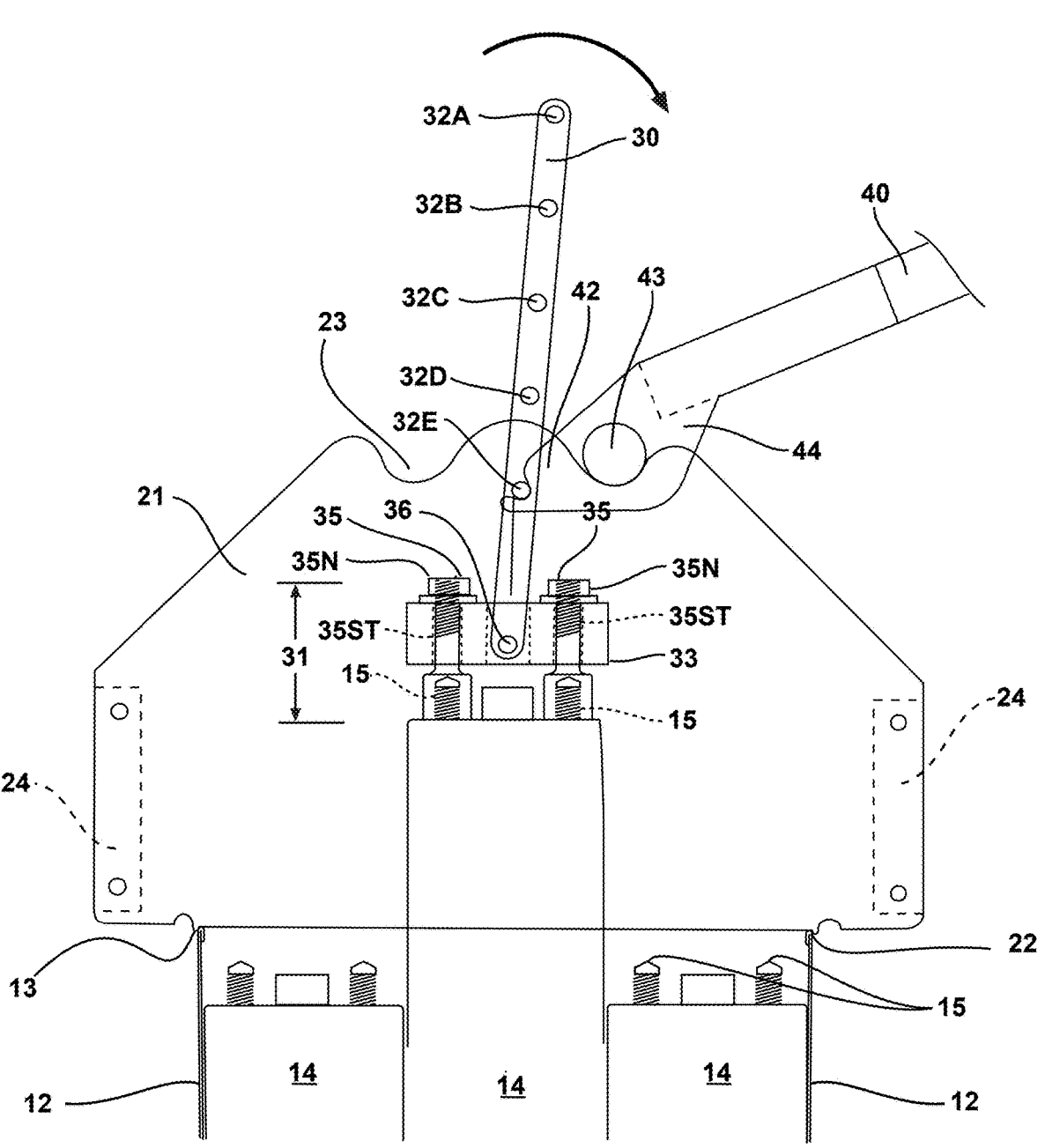
Figure 7H:
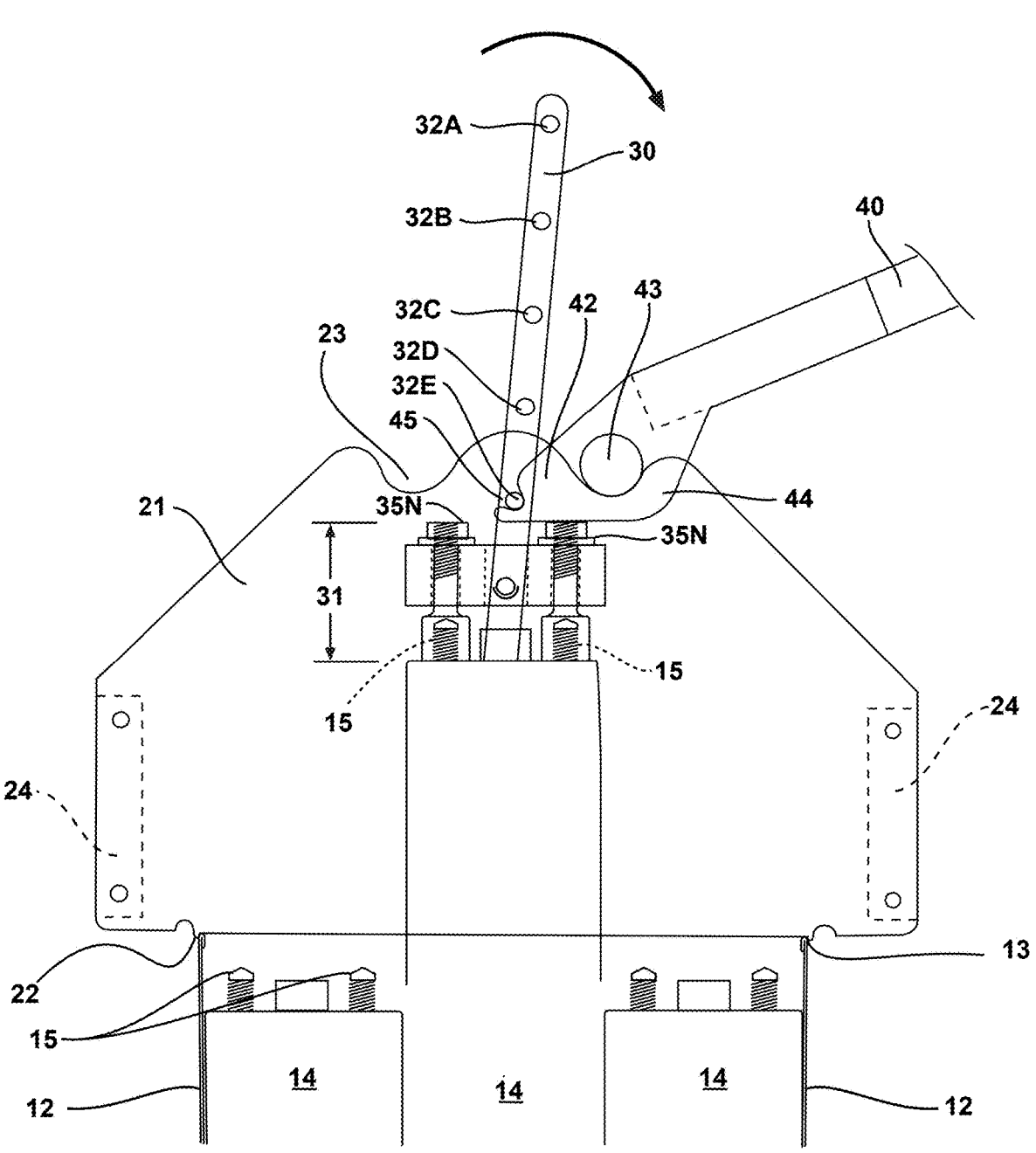

Referring to FIGS. 7C and 7D, the handle 40 is then disengaged from the second peg 32B and engaged with the third peg 32C with the handle 40 pointing upwards. The handle 40 is again depressed towards the floor or other support surface, thereby ratcheting up the battery 10 cell 14.

Referring to FIG. 7E-FIG. 7H, this process is repeated using the fourth and fifth pegs 32D, 32E until the battery 10 cell 14 has been raised far enough to be clear of other battery cells 14 and removed from the housing 11. Any lock 35 is released and the attachment 31 removed from the predetermined and selected cell 14. The cell 14 is then discarded or refurbished. That cell 14 or another suitable cell 14 is then inserted into the cavity remaining from removal of the selected and predetermined cell 14.

It can be seen that the apparatus 20 of the present invention advantageously solves the problem of being able to remove cells 14 of different heights and having different positions within the array of cells 14 defining the grid 16 without adjustment to compensate for the different heights or different positions of the different cells 14. Furthermore the apparatus 20 of the present invention is portable and can be used on multiple generations of multiple platforms of aircraft.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range of that same parameter. That is the upper limit of one range may be used with the lower limit of another range, and vice versa. As used herein, when two components are joined or connected the components may be interchangeably contiguously joined together or connected with an intervening element therebetween. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. An apparatus for removing a battery cell from a rigid housing containing a plurality of contiguous battery cells within upstanding sidewalls of the housing, the cell having at least one upstanding terminal, the apparatus comprising:
    an elongate handle for manipulation by a user;
    a bridge sized to span a pair of opposed sidewalls of the housing, wherein the bridge comprises a pair of spaced apart plates connected in fixed relationship, each plate having a first open receptacle offset from the vertically movable strut for removably receiving the handle therein;
    a strut vertically movably associated with the bridge responsive to articulating input from the handle when operated by a user; and
    at least one attachment pivotably joined to the strut for removably joining to at least one upstanding terminal of a selected battery cell, wherein vertical movement of the strut responsive to manipulation of the handle by the user removes the selected battery cell from the housing independent of the height of the battery cell or position within the housing.

2. An apparatus according to claim 1 wherein the elongate handle has a proximal end for grasping by a user and a distal end opposed thereto and further comprising a pair of mutually opposed trunnions juxtaposed with the distal end of the elongate handle, each trunnion sized to removably fit within a respective open receptacle on a respective plate.

3. An apparatus according to claim 2 wherein the handle has a pair of peg notches and the strut comprises pairs of vertically spaced opposed pegs configured to releasably fit within the respective peg notches.

4. An apparatus according to claim 3 wherein the opposed pegs are mutually opposed.

5. An apparatus according to claim 1 wherein the plate is symmetric about a vertical centerline and further comprising a second open receptacle, with one open receptacle disposed on each side of the vertical centerline of the plate.

6. An apparatus for removing a battery cell from a housing containing a plurality of contiguous battery cells within upstanding sidewalls of the housing, the cell having at least one upstanding threaded terminal, the apparatus comprising:

an elongate handle for manipulation by a user;

a polymeric, non-conductive bridge sized to span a pair of opposed sidewalls of the housing and comprising a pair of spaced apart vertically oriented plates connected in fixed relationship, each plate having a first open receptacle offset from the vertically movable strut for removably receiving the handle therein and being removable therefrom by lifting;

a strut vertically movably associated with the bridge responsive to articulating input from the handle when operated by a user; and at least one polymeric, non-conductive attachment pivotably joined to the strut for removably joining to at least one upstanding terminal of a selected battery cell, wherein vertical movement of the strut responsive to manipulation of the handle by the user removes the selected battery cell from the housing independent of and without compensation for the height of the battery cell or position within the housing.

7. An apparatus according to claim 6 wherein both plates further comprise a pair of spaced apart plate notches, the plate notches being spaced to fit upon the opposed upstanding sidewalls of the housing.

8. An apparatus according to claim 7 wherein the attachment is configured to releasably attach to two spaced apart terminals of a selected battery cell.

9. An apparatus according to claim 8 wherein one terminal of the cell is on each side of the strut when removably joined to the attachment.

10. An apparatus according to claim 9 wherein the attachment comprises a pair of threaded fasters rotatably depending from a spreader pivotally attached to the strut.

11. An apparatus according to claim 10 wherein the selected battery cell comprises externally threaded terminals and the threaded fasteners are internally threaded and sized to threadably engage the externally threaded battery cell terminals.

12. An apparatus according to claim 11 further comprising a lock on the spreader for each threaded fastener and adapted to prevent unintended disengagement of the internally threaded fasteners from the externally threaded battery cell terminals.

13. An apparatus according to claim 12 wherein each lock comprises a threaded stud and complementary nut for releasable attachment thereto.

14. A method for removing a battery cell from a housing containing a grid comprising a plurality of contiguous battery cells within upstanding sidewalls of the housing, the cell having at least one upstanding threaded terminal, the method comprising the step of:

a. providing a handle having a proximal end and a distal end remote therefrom and being adapted for manipulation by a user, the handle having opposed outwardly extending trunnions and at least one peg notch juxtaposed with the distal end a and having, a bridge sized to span a pair of opposed sidewalls of the housing and comprising a pair of spaced apart vertically oriented plates connected in fixed relationship, each plate having a first open receptacle offset from the vertically movable strut for removably receiving the handle therein and being removable therefrom by lifting, a strut vertically movably associated with the bridge responsive to articulating input from the handle when operated by a user; and at least one attachment pivotably joined to the strut for removably joining to at least one upstanding terminal of a selected battery cell, wherein vertical movement of the strut responsive to manipulation of the handle by the user removes the selected battery cell from the housing independent of and without compensation for the height of the battery cell or position within the housing;

b. selecting a battery cell from the grid of battery cells;

c. removably joining the attachment to a pair of terminals upstanding from the selected battery cell using complementary threaded fasteners;

d. pivotally joining the attachment to a strut configured to be upstanding from the attachment and having mutually opposed pegs extending laterally outwardly therefrom;

e. disposing the bridge across and upon opposed sidewalls of the housing;

f. inserting the strut between the spaced apart plates of the bridge with the pegs pointed towards the plates;

g. pivotably resting the trunnions of the handle into respective trunnion notches of the plates;

h. intercepting two opposed pegs of the strut with the at least one peg notch of the handle with the proximal end handle disposed above the distal end of the handle;

i. depressing the proximal end of the handle to thereby responsively lift the battery cell upward;

j. disengaging the handle from the plate opposed pegs and the trunnion notches;

k. re-engaging the handle at a pair of lower pegs by intercepting respective two opposed pegs of the strut with the at least one peg notch of the handle with the proximal end handle disposed above the distal end of the handle; and l. Repeating steps g through k until the battery cell is removed from the housing, where steps c, d, e, and f are performed in any order.

15. A method according to claim 14 wherein step c is performed before step d.

16. A method according to claim 15 further comprising the step of threadably locking the attachment to the pair of terminals.

17. A method according to claim 14 further comprising the step of removing a second battery cell from the housing according to steps b-1 without adjusting the apparatus to compensate for the position of the second battery cell.

18. A method according to claim 17 wherein the grid comprising a plurality of contiguous battery cells comprises battery cells of mutually different heights and further comprising the step of removing a second battery cell from the housing according to steps b-1 without adjusting the apparatus to compensate for the height of the second battery cell.

19. A method according to claim 18 wherein the handle has length between the proximal end and the distal end of 0.5 m to 0.7 m.

\* \* \* \* \*